(12) United States Patent
Winnik

(10) Patent No.: US 6,398,394 B1
(45) Date of Patent: Jun. 4, 2002

(54) VEHICLE DOME LIGHT AND FLASHLIGHT

(76) Inventor: Jack K. Winnik, 776 Meadow Dr., Des Plaines, IL (US) 60016

( * ) Notice: Subject to any disclaimer, the term of this patent is extended or adjusted under 35 U.S.C. 154(b) by 3 days.

(21) Appl. No.: 09/621,984

(22) Filed: Jul. 21, 2000

(51) Int. Cl.$^7$ ................................................. B60Q 3/02
(52) U.S. Cl. ........................ 362/490; 362/486; 362/488; 362/200; 362/183
(58) Field of Search .............................. 362/486, 490, 362/488, 200, 183

(56) References Cited

U.S. PATENT DOCUMENTS

| | | |
|---|---|---|
| 4,819,134 A | 4/1989 | Rossi |
| 5,077,643 A | 12/1991 | Leach |
| D358,674 S | 5/1995 | Ramsey |
| 5,465,200 A | 11/1995 | Finocchio et al. |
| 5,521,806 A | 5/1996 | Hutzel et al. |
| 5,599,086 A * | 2/1997 | Dutta ........................... 362/74 |
| 5,645,340 A | 7/1997 | Colton |
| 5,984,495 A * | 11/1999 | Roberts et al. ............. 362/490 |
| 6,022,131 A * | 2/2000 | Morimoto et al. .......... 362/549 |
| 6,260,985 B1 * | 7/2001 | Zeller ......................... 362/202 |

* cited by examiner

*Primary Examiner*—Sandra O'Shea
*Assistant Examiner*—Anabel Ton

(57) ABSTRACT

A vehicle dome light and flashlight for providing a readily available and charged flashlight for use in and out of a vehicle. The vehicle dome light and flashlight includes a dome light assembly being adapted to be securely mounted to a top of a vehicle inside a passenger compartment thereof and having a first housing including a flashlight charging compartment disposed therein and an opening into the flashlight charging compartment; and also includes a second housing having side walls, a front wall, and a window disposed in the front wall with the housing being securely and removably attached to the first housing; and further includes at least one light-emitting member disposed in the second housing; and also includes an energizing assembly for energizing the at least one light-emitting member.

9 Claims, 3 Drawing Sheets

VEHICLE DOME LIGHT AND FLASHLIGHT

BACKGROUND OF THE INVENTION

1. Field of the Invention

The present invention relates to a vehicle dome and portable light and more particularly pertains to a new vehicle dome light and flashlight for providing a readily available and charged flashlight for use in and out of a vehicle.

2. Description of the Prior Art

The use of a vehicle dome and portable light is known in the prior art. More specifically, a vehicle dome and portable light heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,819,134; U.S. Pat. No. 5,077,643; U.S. Pat. No. 5,645,340; U.S. Pat. No. 5,465,200; U.S. Pat. No. 5,521,806; and U.S. Pat. No. Des. 358,674.

While these devices fulfill their respective, particular objectives and requirements, the aforementioned patents do not disclose a new vehicle dome light and flashlight. The inventive device includes a dome light assembly being adapted to be securely mounted to a top of a vehicle inside a passenger compartment thereof and having a first housing including a flashlight charging compartment disposed therein and an opening into the flashlight charging compartment; and also includes a second housing having side walls, a front wall, and a window disposed in the front wall with the housing being securely and removably attached to the first housing; and further includes at least one light-emitting member disposed in the second housing; and also includes an energizing assembly for energizing the at least one light-emitting member.

In these respects, the vehicle dome light and flashlight according to the present invention substantially departs from the conventional concepts and designs of the prior art, and in so doing provides an apparatus primarily developed for the purpose of providing a readily available and charged flashlight for use in and out of a vehicle.

SUMMARY OF THE INVENTION

In view of the foregoing disadvantages inherent in the known types of vehicle dome and portable light now present in the prior art, the present invention provides a new vehicle dome light and flashlight construction wherein the same can be utilized for providing a readily available and charged flashlight for use in and out of a vehicle.

The general purpose of the present invention, which will be described subsequently in greater detail, is to provide a new vehicle dome light and flashlight which has many of the advantages of the vehicle dome and portable light mentioned heretofore and many novel features that result in a new vehicle dome light and flashlight which is not anticipated, rendered obvious, suggested, or even implied by any of the prior art vehicle dome and portable light, either alone or in any combination thereof.

To attain this, the present invention generally comprises a dome light assembly being adapted to be securely mounted to a top of a vehicle inside a passenger compartment thereof and having a first housing including a flashlight charging compartment disposed therein and an opening into the flashlight charging compartment; and also includes a second housing having side walls, a front wall, and a window disposed in the front wall with the housing being securely and removably attached to the first housing; and further includes at least one light-emitting member disposed in the second housing; and also includes an energizing assembly for energizing the at least one light-emitting member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle dome light and flashlight which has many of the advantages of the vehicle dome and portable light mentioned heretofore and many novel features that result in a new vehicle dome light and flashlight which is not anticipated, rendered obvious, suggested, or even implied by any of the prior art vehicle dome and portable light, either alone or in any combination thereof.

It is another object of the present invention to provide a new vehicle dome light and flashlight which may be easily and efficiently manufactured and marketed.

It is a further object of the present invention to provide a new vehicle dome light and flashlight which is of a durable and reliable construction.

An even further object of the present invention is to provide a new vehicle dome light and flashlight which is susceptible of a low cost of manufacture with regard to both materials and labor, and which accordingly is then susceptible of low prices of sale to the consuming public, thereby making such vehicle dome light and flashlight economically available to the buying public.

Still yet another object of the present invention is to provide a new vehicle dome light and flashlight which provides in the apparatuses and methods of the prior art some of the advantages thereof, while simultaneously overcoming some of the disadvantages normally associated therewith.

Still another object of the present invention is to provide a new vehicle dome light and flashlight for providing a readily available and charged flashlight for use in and out of a vehicle.

Yet another object of the present invention is to provide a new vehicle dome light and flashlight which includes a dome light assembly being adapted to be securely mounted to a top of a vehicle inside a passenger compartment thereof and having a first housing including a flashlight charging compartment disposed therein and an opening into the flashlight charging compartment; and also includes a second housing having side walls, a front wall, and a window disposed in the front wall with the housing being securely and removably attached to the first housing; and further includes at least one light-emitting member disposed in the second housing; and also includes an energizing assembly for energizing the at least one light-emitting member.

Still yet another object of the present invention is to provide a new vehicle dome light and flashlight that conveniently stores and charges a flashlight inside a vehicle.

Even still another object of the present invention is to provide a new vehicle dome light and flashlight that uses the electrical system of the vehicle to charge the battery of the flashlight.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
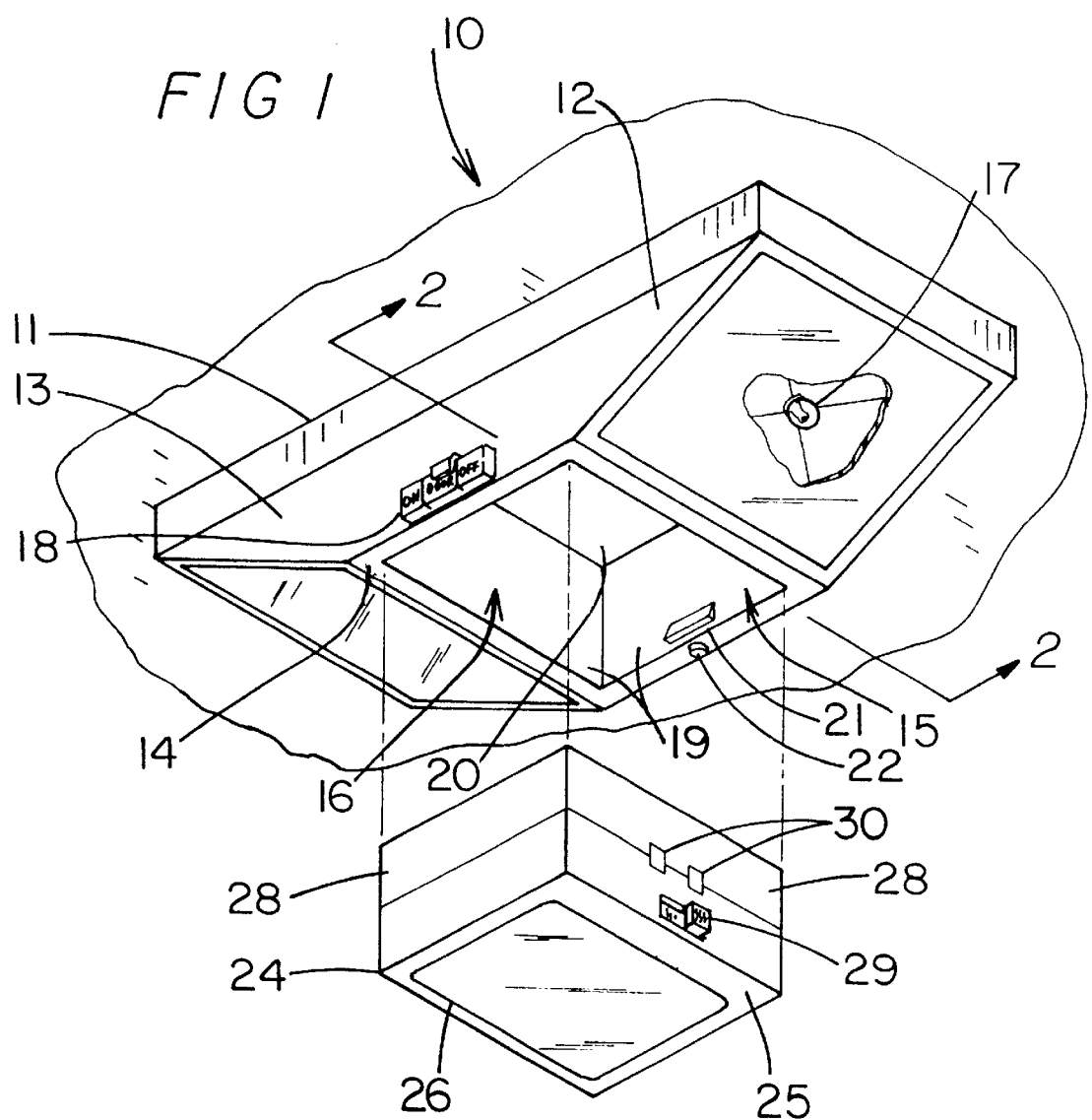
FIG. 1 is a perspective view of a new vehicle dome light and flashlight according to the present invention.
Figure 2:
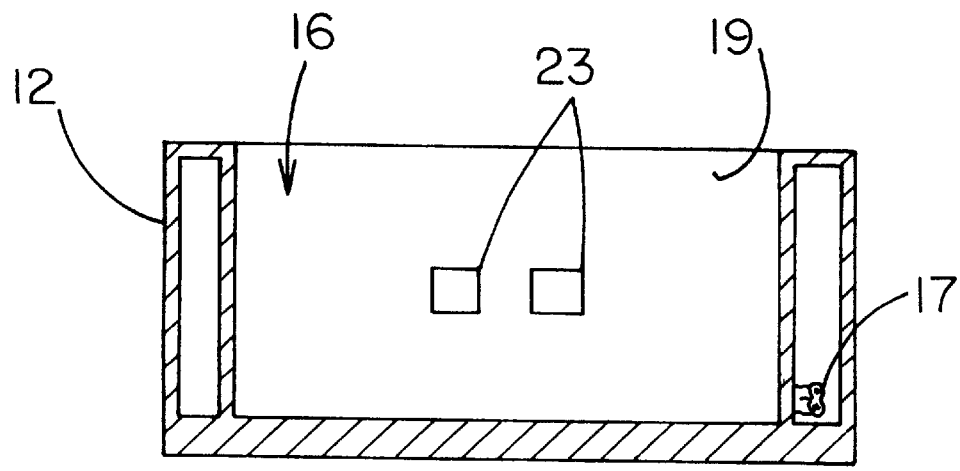
FIG. 2 is a cross-sectional view of the flashlight charging compartment of the present invention.
Figure 3:
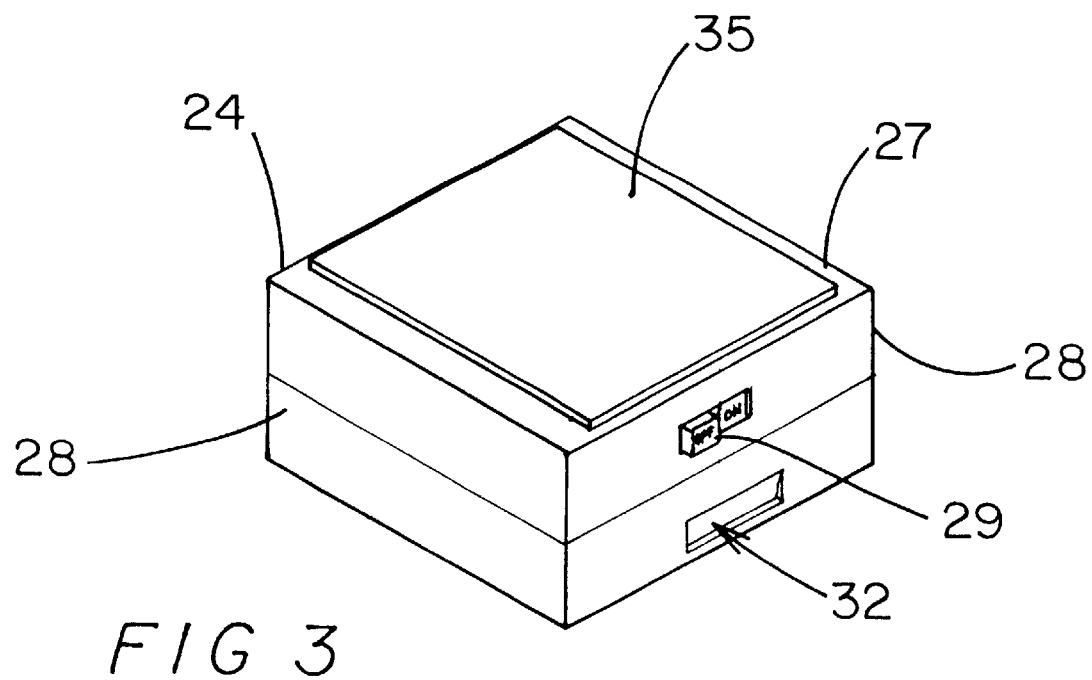
FIG. 3 is a top perspective view of the second housing of the present invention.
Figure 4:
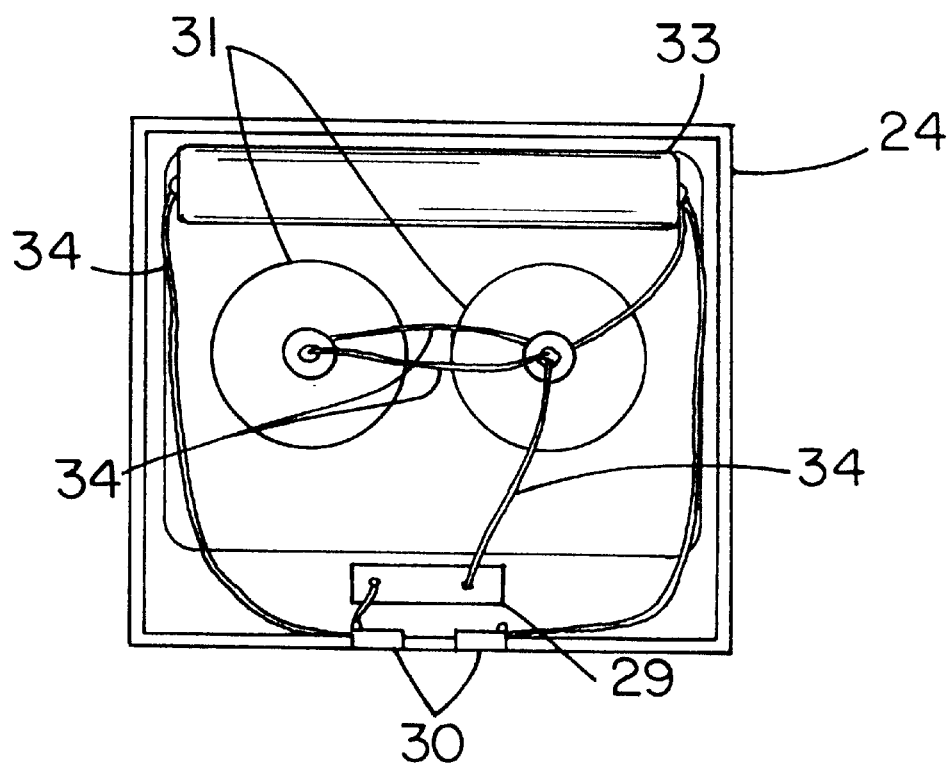
FIG. 4 is a cross-sectional view of the second housing of the present invention.
Figure 5:
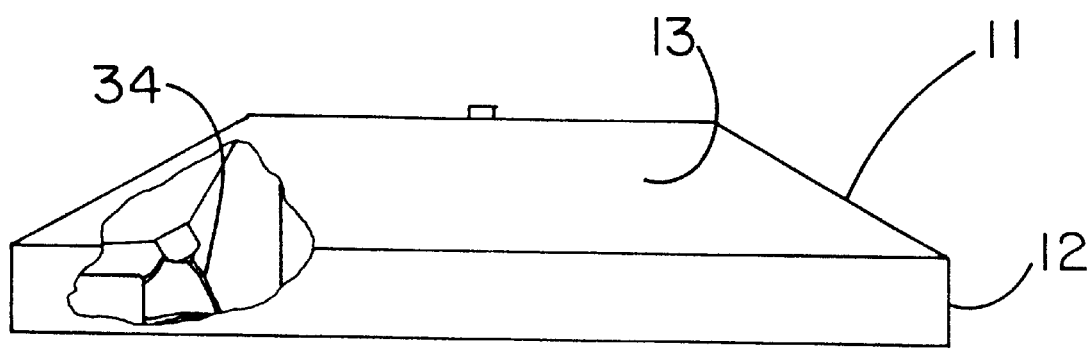
FIG. 5 is a side elevational view of the dome light assembly with a cutaway of the present invention.

With reference now to the drawings, and in particular to FIGS. 1 through 5 thereof, a new vehicle dome light and flashlight embodying the principles and concepts of the present invention and generally designated by the reference numeral 10 will be described.

As best illustrated in FIGS. 1 through 5, the vehicle dome light and flashlight 10 generally comprises a dome light assembly 11 being adapted to be securely and conventionally mounted to a top of a vehicle inside a passenger compartment thereof and having a first housing 12 including a flashlight charging compartment 16 disposed therein and an opening 15 into the flashlight charging compartment 16. The first housing 11 includes a bottom wall 14 with the opening 15 being disposed through the bottom wall 14 and into the flashlight charging compartment 16. The flashlight charging compartment 16 is defined by side walls 19. The dome light assembly 11 also includes a light 17 securely and conventionally disposed in the first housing 12 and a switch member 18 being securely and conventionally mounted upon an exterior of a side wall 13 of the first housing 12 for energizing the light 17 either manually or by a door of the vehicle being opened. The dome light assembly 11 further includes a latch mechanism conventionally mounted to the first housing 12 and includes a latch member 21 movably disposed in one of the side walls 19 of the flashlight charging compartment 16 and being biasedly disposed in the flashlight charging compartment 16, and also includes a latch release member 22 depressibly and conventionally disposed in the bottom wall 14 of the first housing 12 near the opening 15 therein. The dome light assembly 11 further includes first electrical contact members 23 being securely and conventionally attached to one of the side walls 19 of the flashlight charging compartment 16 and being disposed in the flashlight charging compartment 16.

The vehicle dome light and flashlight 10 includes a second housing 24 having side walls 28, a front wall 25, and a window 26 conventionally disposed in the front wall 25. The second housing 24 is securely and removably attached to the first housing 12. The second housing 12 has a slot 32 disposed in one of the side walls 28 thereof and being adapted to removably receive the latch member 21 for securely retaining the second housing 24 in the flashlight charging compartment 16. The second housing 24 is approximately 16 square inches and has a depth of approximately 2 inches. At least one light-emitting member 31 is conventionally disposed in the second housing 24.

Means for energizing and charging the at least one light-emitting member 31 includes second electrical current contact members 30 being securely and conventionally disposed in an exterior of one of the side walls 28 of the second housing 24 and being in contactable relationship to the first current contact members 23 upon the second housing 24 being disposed in the flashlight charging compartment 16. A battery 33 is securely and conventionally disposed in the second housing 24 and is connected to the second electrical current contact members 30 with wires 34. A switch 29 is movably and conventionally disposed upon an exterior of the second housing 24 and is connected to the second electrical current contact members 30 and to the at least one light-emitting member 31 with wires 34. A magnetic strip member 35 is securely and conventionally attached to an exterior of a back wall 27 of said second housing 24 for attaching to a top wall 20 defining the flashlight charging compartment 16 and for retaining the second housing 24 in the flashlight charging compartment 16.

In use, the user places the second housing 24 in the flashlight charging compartment 16 of the first housing 12 to charge the battery 33 of the flashlight. When needed, the user can push the latch release member 22 to remove the second housing 24 from the first housing 12 and can take the second housing 24 outside of the vehicle and can use the second housing 24 just like any flashlight.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle dome light and flashlight comprising:
   a dome light assembly for mounting to a top of a vehicle inside a passenger compartment thereof, said dome light assembly having a first housing including a flashlight charging compartment disposed therein and an opening into said flashlight charging compartment;
   a second housing having side walls, a front wall, and a window disposed in said front wall, said window extending substantially an entire length and an entire width of said front wall, said second housing being removably attached to said first housing, said second housing being removably nestable in said flashlight charging compartment;
   at least one light-emitting member disposed in said second housing for shining light through said window;
   a switch mounted on said second housing for selectively providing power to said at least one light emitting member, said switch being mounted on one of said side walls of said second housing such that said switch is positioned in said flashlight charging compartment when said second housing is nested in said flashlight charging compartment; and
   means for energizing and charging said at least one light-emitting member.

2. A vehicle dome light and flashlight as described in claim 1, wherein said first housing includes a bottom wall with said opening being disposed through said bottom wall and into said flashlight charging compartment, said flashlight charging compartment being defined by side walls.

3. A vehicle done light and flashlight as described in claim 1, wherein said dome light assembly also includes a light disposed in said first housing and a switch member being mounted upon an exterior of a side wall of said first housing for energizing said light either manually or by a door of the vehicle being opened.

4. A vehicle dome light and flashlight as described in claim 2, wherein said dome light assembly further includes a latch mechanism mounted to said first housing and including a latch member movably disposed in one of said side walls of said flashlight charging compartment and being biasedly disposed in said flashlight charging compartment, and also including a latch release member depressibly disposed in said bottom wall of said first housing near said opening therein.

5. A vehicle dome light and flashlight as described in claim 2, wherein said dome light assembly further includes first electrical contact members being attached to one of said side walls of said flashlight charging compartment and being disposed in said flashlight charging compartment.

6. A vehicle dome light and flashlight as described in claim 4, wherein said second housing has a slot disposed in one of said side walls thereof and being adapted to removably receive said latch member for retaining said second housing in said flashlight charging compartment.

7. A vehicle dome light and flashlight as described in claim 5, wherein said means for energizing at least one light-emitting member includes second electrical current contact members disposed in an exterior of one of said side walls of said second housing and being in contactable relationship to said first current contact members upon said second housing being disposed in said flashlight charging compartment, a battery disposed in said second housing and being connected to said second electrical current contact members, and a switch being movably disposed upon an exterior of said second housing and being connected to said second electrical current contact members and to said at least one light-emitting member.

8. A vehicle dome light and flashlight as described in claim 1, further includes a magnetic strip member being attached to an exterior of a back wall of said second housing for attaching to a top wall defining said flashlight charging compartment and retaining said second housing in said flashlight charging compartment.

9. A vehicle dome light and flashlight comprising:
   a dome light assembly for mounting to a top of a vehicle inside a passenger compartment thereof, said dome light assembly having a first housing including a flashlight charging compartment disposed therein and an opening into said flashlight charging compartment;
   a second housing having side walls, a front wall, and a window disposed in said front wall, said window extending substantially an entire length and an entire width of said front wall, said second housing being removably attached to said first housing, said second housing being removably nestable in said flashlight charging compartment;
   at least one light-emitting member disposed in said second housing for shining light through said window;
   a switch mounted on said second housing for selectively providing power to said at least one light emitting member, said switch being mounted on one of said side walls of said second housing such that said switch is positioned in said flashlight charging compartment when said second housing is nested in said flashlight charging compartment; and
   means for energizing and charging said at least one light-emitting member;
   wherein said first housing includes a bottom wall with said opening being disposed through said bottom wall and into said flashlight charging compartment, said flashlight charging compartment being defined by side walls;
   wherein said dome light assembly also includes a light disposed in said first housing and a switch member being mounted upon an exterior of a side wall of said first housing for energizing said light either manually or by a door of the vehicle being opened;
   wherein said dome light assembly further includes a latch mechanism mounted to said first housing and including a latch member movably disposed in one of said side walls of said flashlight charging compartment and being biasedly disposed in said flashlight charging compartment, and also including a latch release member depressibly disposed in said bottom wall of said first housing near said opening therein;
   wherein said dome light assembly further includes first electrical contact members being attached to one of said side walls of said flashlight charging compartment and being disposed in said flashlight charging compartment;

wherein said second housing has a slot disposed in one of said side walls thereof and being adapted to removably receive said latch member for retaining said second housing in said flashlight charging compartment;

wherein said means for energizing at least one light-emitting member includes second electrical current contact members disposed in an exterior of one of said side walls of said second housing and being in contactable relationship to said first current contact members upon said second housing being disposed in said flashlight charging compartment, a battery disposed in said second housing and being connected to said second electrical current contact members, and a switch being movably disposed upon an exterior of said second housing and being connected to said second electrical current contact members and to said at least one light-emitting member;

a magnetic strip member being attached to an exterior of a back wall of said second housing for attaching to a top wall defining said flashlight charging compartment and retaining said second housing in said flashlight charging compartment.

* * * * *